United States Patent Office 3,324,275
Patented June 6, 1967

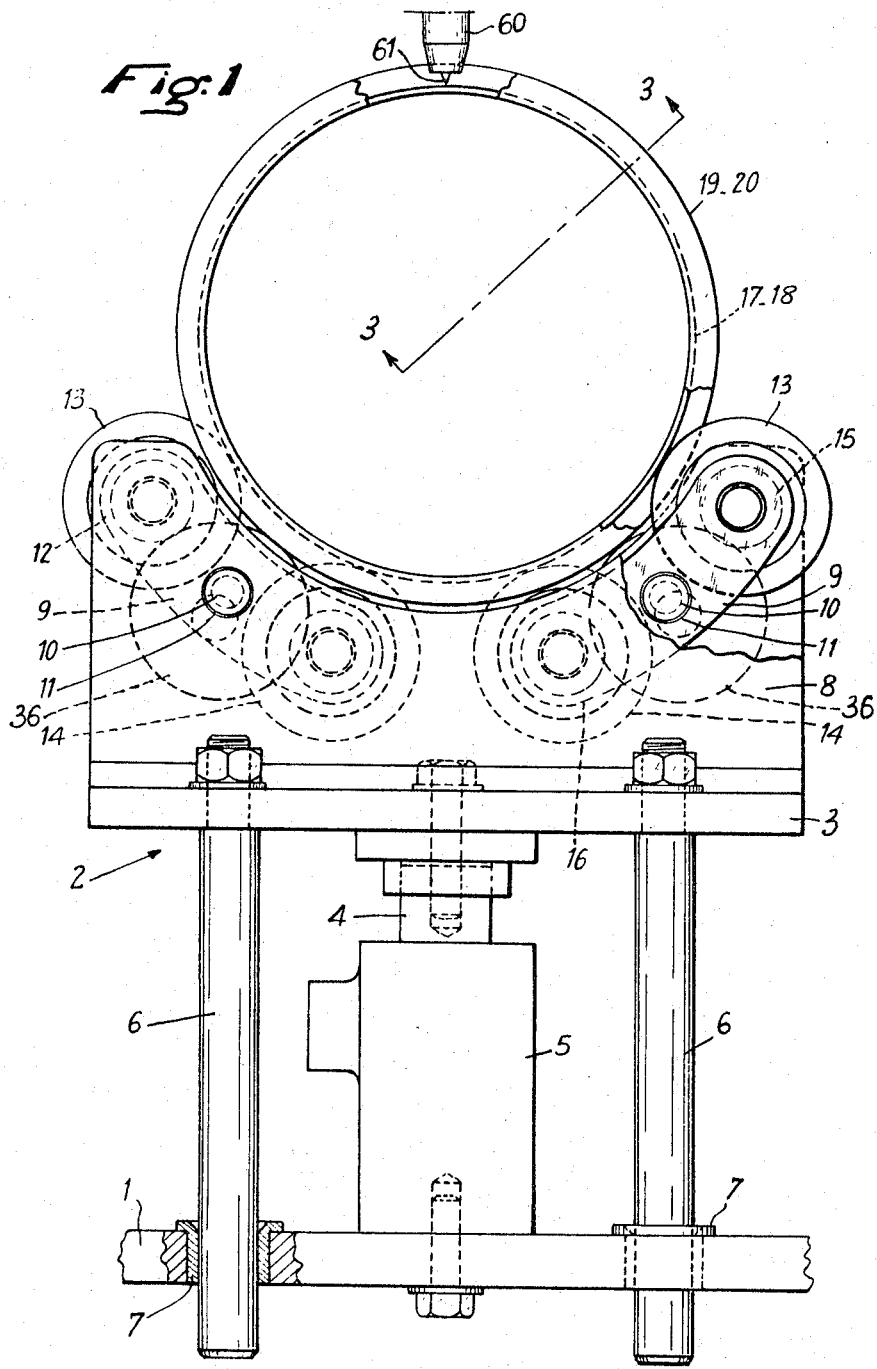

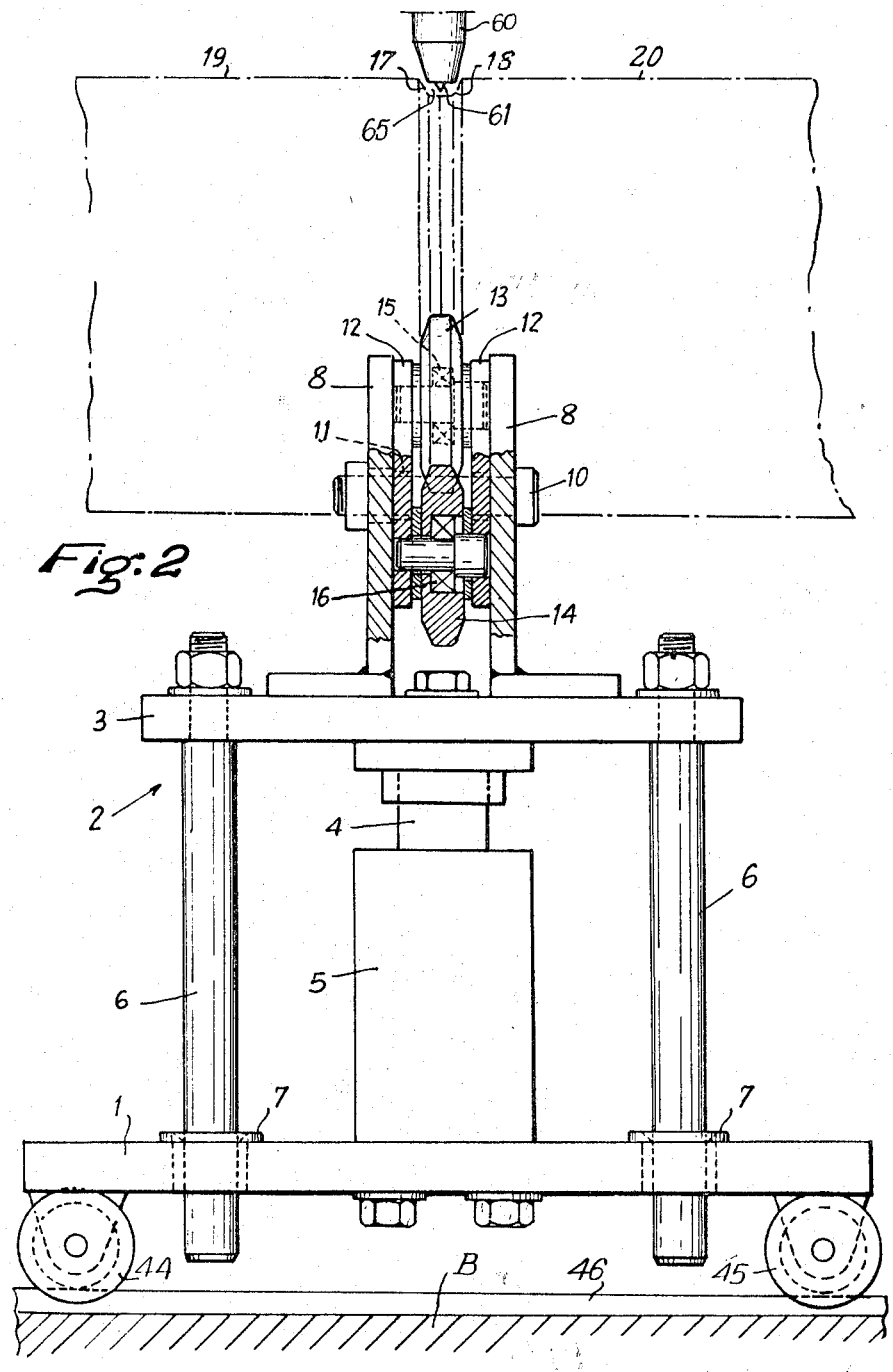

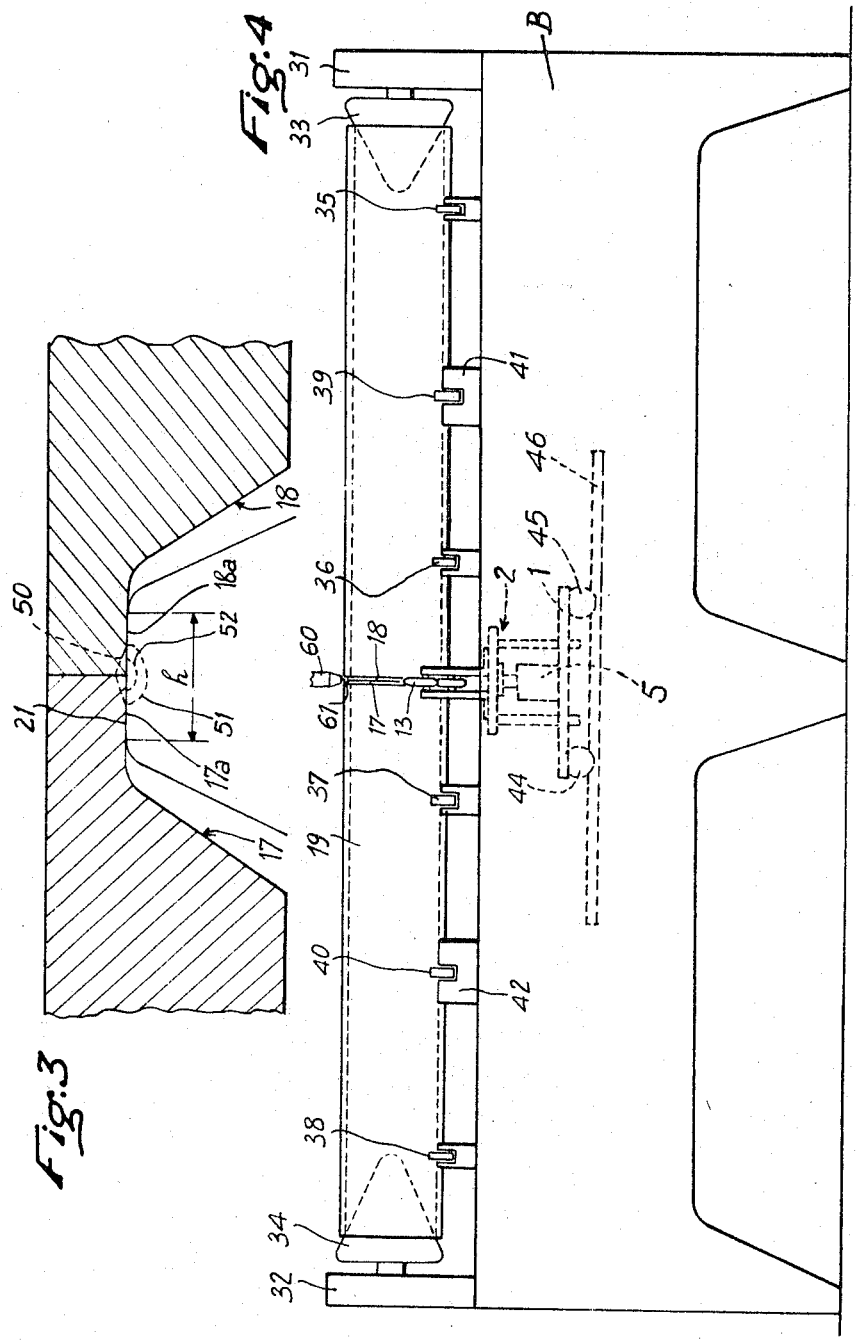

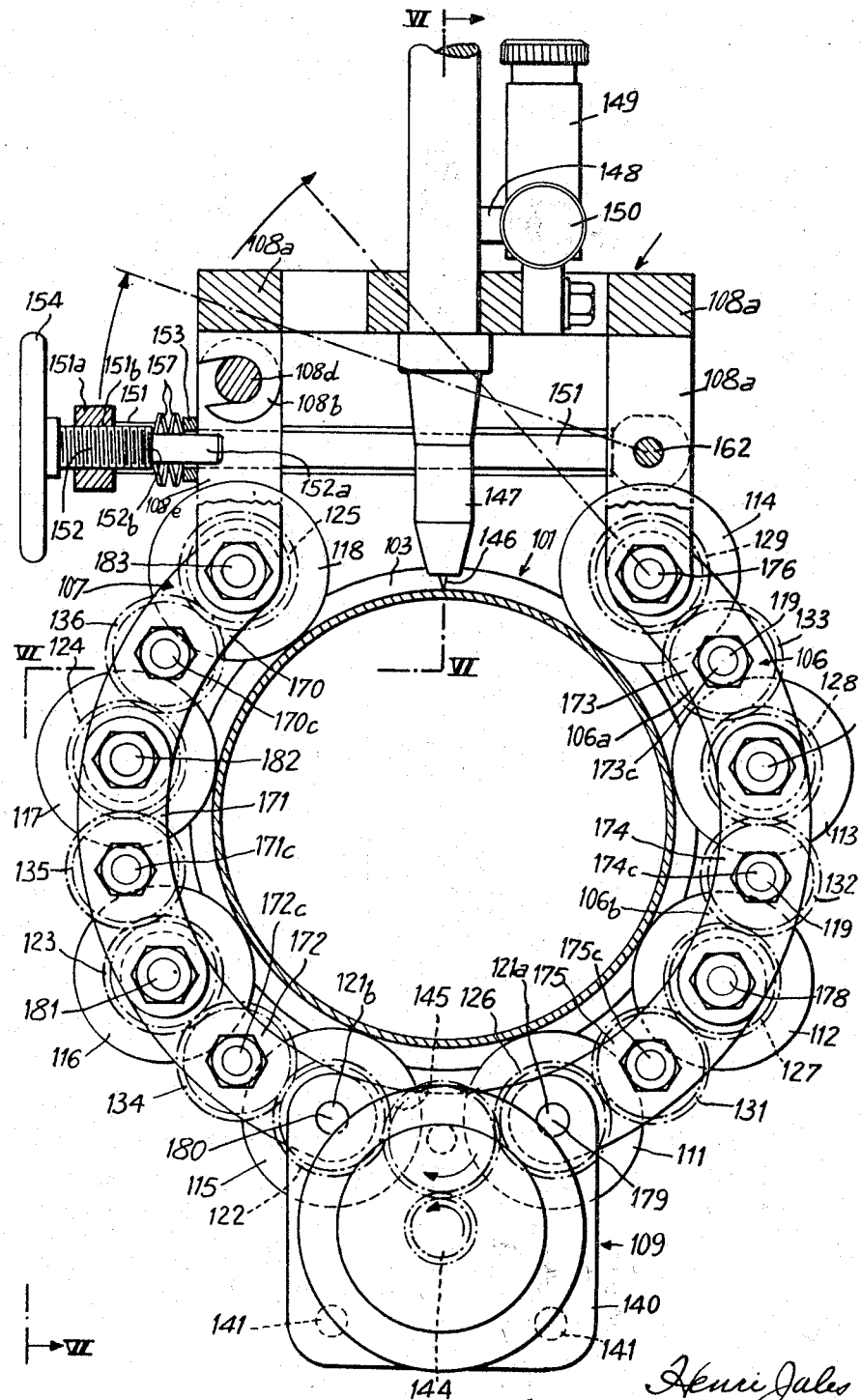

3,324,275
METHOD OF AND APPARATUS FOR CENTERING AXIALLY ALIGNED TUBES FOR BUTT WELDING
Henri Jules Peignen, St. Mande, France, assignor to Societe Biraghi, Haute-Savoie, France, a French joint-stock company
Continuation of application Ser. No. 349,389, Mar. 4, 1964. This application July 13, 1964, Ser. No. 382,158
Claims priority, application France, Mar. 6, 1963, 927,007; May 14, 1963, 934,800
14 Claims. (Cl. 219—60)

ABSTRACT OF THE DISCLOSURE

The invention pertains to a method of and a machine for centering two axially aligned tubes prior to and during an end-to-end welding operation wherein the abutting tube ends are chamfered to provide a peripheral groove. The machine, in addition to a welding mechanism, carries at least two centering rollers riding in the groove formed by the two tube ends while a relative rotary motion takes place between the machine on one hand and the axially aligned tubes on the other.

---

This application is a continuation of application Ser. No. 349,389, filed Mar. 4, 1964, now abandoned.

It is a well-known fact that it is possible to connect endwise two tubes by welding them while they are driven into rotation in front of an electrode of refractory material and then in front of a blow-pipe fed with a wire fuse, said electrode and blow-pipe lying in the plane of connection between the tubes, the electrode operating during the first revolution of the tubes with a view to closing the joint between the tubes and to initiating a rigid interconnection between the tubes while the blow-pipe executes the following operations adapted to insert round the joint a thickness of metal which is sufficient for ensuring the desired mechanical resistance. Generally, the ends of the tubes are bevelled in a manner such that, when arranged endwise, their bevels form a groove adapted to be filled with molten wire material during the welding operations executed with the blow-pipe.

However, said known method requires a centering as accurate as possible in the plane of engagement between the terminal surfaces of the two tubes during the first operation executed with the electrode. This centering is, as a matter of fact, essential for obtaining a first homogeneous welding base of a uniform thickness.

The present invention has for its object a method and a machine which allows executing automatically the relative centering of the parts to be welded on both tubes.

Said invention has also for its object a machine ensuring an accurate guiding of the refractory electrode at a constant distance from the bottom of the groove provided for the welding.

With a view to obtaining such results, it has appeared as essential, in the case of a welding method of the type disclosed hereinabove incorporating the excecution of a bevel at the end of each of the two tubular elements to be welded together, to produce said bevel on a lathe while a reference surface constituted by the bottom of the groove formed by the two associated bevels is selected both for the centering of the two tubes and for the guiding of the refractory electrode at a constant distance from the bottom of said groove.

For this purpose, the present invention has for its object a method for centering the terminal sections of the two tubes which are to be connected by welding, said method comprising forming on the outer end of each terminal section of the cooperating ends of the tubes to be welded, a bevel in the shape of a surface of revolution, in setting the two tubes in endwise contacting relationship in substantially coaxial position on an apparatus including carrier means and axial holding means, in a manner such that the associated bevels form a groove, after which the bottom of said groove is subjected to the action of at least two centering rollers carried in the plane of connection between the tubes and provided with a bearing surface the outline of which matches that of the bottom of the groove while pressure means are provided for urging the rollers into contact with said groove.

Such a method allows executing a continuous welding of the joint throughout a complete revolution by means of a refractory electrode rigid with the frame of the machine, operating preferably in an atmosphere of argon, while retaining the high accuracy required for the welding procedure. As a matter of fact, the bottom of the groove constituted by the two bevels executed on the lathe, plays the part of a reference surface and allows maintaining during operation the electrode rigid with the roller-carrying frame at a perfectly constant distance from said bottom, while the two bevelled ends of the tubes are held in an accurately coaxial position by the rollers on which they rest. The groove is then filled in a conventional manner by means of a welding blow-pipe feeding a wire fuse.

According to a modification of the invention which is more particularly intended for the case where at least one of the two sections to be interconnected cannot be driven into rotation, that is in the case where the refractory electrode has actually to execute a complete revolution round the tube, the welding machine includes a support for the refractory electrode associated with means adjusting the latter, said support being rigid with at least one of two half-collars pivotally interconnected through one of their ends, and provided at their opposite ends with cooperating locking means; said support carrying a plurality of revolvable rollers adapted to cooperate with the bottom of the groove and lying in a plane parallel with the plane of the collar.

The details of the invention, as well as additional objects and advantages, will be clearly understood with reference to a preferred embodiment illustrated in the accompanying drawings employing similar reference numerals to identify the same elements in each of the several views, and in which:

FIG. 1 is a lateral sectional view, partly torn off, of a centering system including two pairs of rollers in accordance with the invention;

FIG. 2 is a front view of the same system with a partial cross-section through one pair of rollers;

FIG. 3 is an enlarged sectional view of the peripheral groove formed by two abutting tubes taken along any axial plane 3—3 extending through the tubes of FIG. 1;

FIG. 4 is a general diagrammatic view of the improved welding means;

FIG. 5 is a front elevational partly sectional view of a machine according to the invention.

Figure 6:
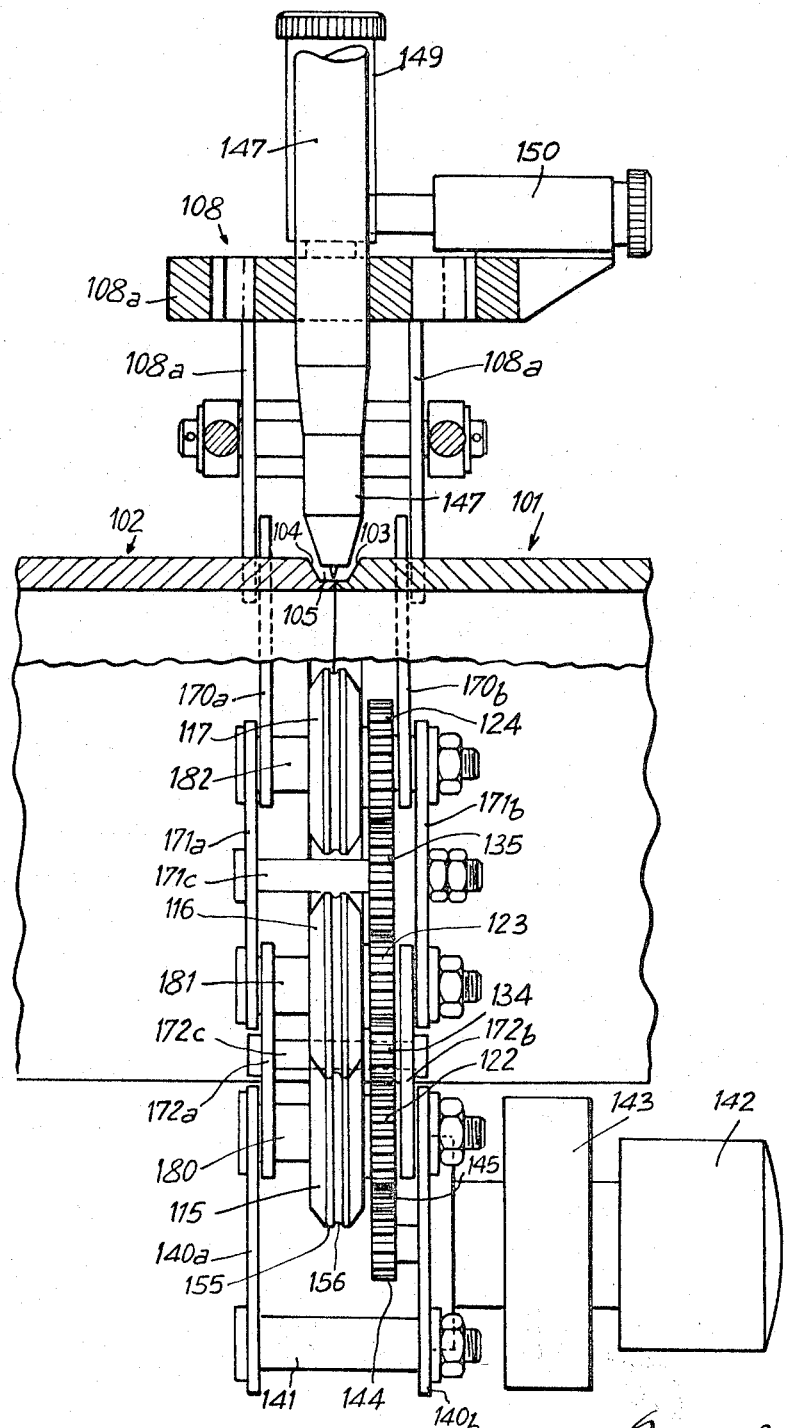
FIG. 6 is a side view, partly sectional, through line VI—VI of FIG. 5 of the same machine.

In FIGS. 1 and 2, 1 designates the lower support carrying a set of rollers, which support lying in the vicinity of the plane of connection between the tubes to be welded together is slidingly fitted within reference to the frame B of the apparatus driving the tubes. The centering system 2 includes an upper support 3 rigid with the piston 4 of the hydraulic jack 5 secured in its turn to the lower support 1. On the other hand, the underside of the upper support 3 is rigid with four guiding rods 6 adapted to slide inside rings 7 fitted in the lower support or carrier plate 1. Thus, the upper support 3 follows the vertical movements of the piston 4 without any lateral shifting.

To the upper support 3 are secured two vertical flanges or straddling means 8 the upper edges of which form arcs of a circle the radius of which is larger than that of the tubes to be welded. As seen in FIGS. 1 and 2, flanges 8 partially surround or straddle the tubes 19, 20 positioned for the welding operation. Between said flanges are housed two sets of rollers 9 each including a horizontal spindle 10, said spindles being revolvably carried in bronze rings 11 housed inside the flanges 8 and arranged symmetrically with reference to the radial vertical plane of symmetry of the tubes 19, 20 to be welded together.

Each of the sets of rollers 9 includes two parallel flanges 12 carried by the spindle 10 and the shape of which is substantially of a fraction of an annulus between which two rollers 13 and 14 of hard steel are revolvably carried with the interposition of ball-bearings 15 and 16 secured between said flanges.

The outline of the treads of the rollers 13 and 14 matches that of the groove 65 constituted by the juxtaposition of the bevels 17 and 18 at the ends of the tubes to be welded together 19 and 20, the outer sections 17a and 18a of said bevels having an arcuate cross-section. In the example illustrated, the tread 21 of each roller illustrated in FIG. 3 is constituted by a cylinder of a height h which is slightly less than the breadth of the bottom of the groove.

In FIG. 4, the frame B is shown as carrying at each end a support 31 or 32 adapted to slide longitudinally with reference to the frame and carrying the corresponding conical elements 33 or 34 adapted to revolve freely thereon.

The tubes 19 and 20 which are to be welded together rest on the rollers which are also adapted to revolve freely as illustrated at 35, 36, 37 and 38 and also on the rotary driving rollers 39 and 40, the latter of which are provided with a rubber-coated tread and are carried on supports 41 and 42, said rollers being connected with means driving them into rotation and not illustrated.

The centering system 2 carrying the centering rollers 13 and illustrated diagrammatically in FIG. 4, is carried on the carrier plate 1 slidingly fitted with the interposition of rollers 44 and 45 on the raceway 46 rigid with the frame B.

The operation of the arrangement described is as follows: the juxtaposed tubes 19 and 20 are revolvably supported adjacent to their opposite ends as at 35, 36 and 37, 38, respectively, with the aforementioned driving rollers 39 and 40 being positioned substantially of the support means. Diametrically opposed conical elements 33 and 34 exert a moderate longitudinal pressure on the end of the tube which it engages so as to reduce the clearance between the confronting edges of the tubes and the centering rollers are then brought into the planes of the groove constituted by the bevelled ends 17 and 18 and they are finally brought into contact with said bevelled ends by a longitudinal shifting of the support 1 over the raceway 46, after which the jack 5 forming part of the system 2 is subjected to pressure. The rising movement is stopped at the moment at which the two sets of rollers engage the bottom of the groove 65, without, however, the tubes moving away from the cooperating rubber-coated driving rollers. Each roller thus carries the corresponding end of a tube, which end has been previously bevelled on a lathe so that said tubes are held in perfect coaxial relationship with reference to each other.

The first operative stage is then executed with the refractory electrode 61 carried by the nozzle 60 which blows argon onto the electrode and which is adjustably secured to the frame B, while the driving means are set into rotation. The tubes are thus welded edgewise together during the first operative stage which lasts throughout one complete revolution. The welding forms between the tubes a bead provided generally in the contacting plane between the tubes with a slightly recessed section 50 (FIG. 3) which disturbs by no means the running of the rollers, and consequently the centering of the two tubes.

At the end of the first operative stage and before the second revolution of the tubes begins, the refratcory electrode ceases operating and the system carrying the centering rollers is lowered so as to release the groove between the tubes after which said groove is filled through the agency of the welding blow-pipe fed with a wire fuse.

In the case where the conditions of welding are such that they lead to the production of a projecting bead, as illustrated at 52 (FIG. 3), it is necessary to provide on the roller a groove similar to that illustrated in interrupted lines at 51 in said FIG. 3.

In FIGS. 5 and 6, 101 and 102 designate the tubes to be welded together and the ends of which are provided with the bevels 103 and 104 of which the juxtaposition forms the groove 105.

The tubes 101 and 102 are held endwise in a coaxial position under the action of the supporting means and of the axially holding means which have not been illustrated.

The machine includes on the one hand two roller-carrying half-collars or straddling means 106 and 107, a support for the refractory electrode designated as a whole by the reference number 108 and the means driving the system into rotation designated as a whole by the reference number 109.

The two half-collars 106, 107 are constituted each by links 170, 171, 172, 173, 174, 175, which are each constituted by flanges such as 170a, 170b, 171a, 171b, 172a, 172b, 173a, 173b, 174a, 174b, 175a, 175b, the cooperating flanges being interconnected by the stays 170c, 171c, 172c, 173c, 174c, 175c.

The links carry at their ends spindles such as those designated by the reference numbers 176 to 183 and through which the successive links are connected together, or in the case of the spindles at the outer ends of the extreme links, with the support 108 or with the driving system 109.

The spindles 176 to 183 carry revolvably the corresponding rollers 111 to 118. Each roller is coaxially rigid with a pinion as illustrated at 122 to 125 and at 126 to 129 for each half-collar. Said pinions mesh pairwise with the intermediate pinions 131 to 133 and 134 to 136 which are revolvably carried by the above-mentioned stays 170c to 172c and 173c to 175c, and consequently any rotation of the rollers 111 to 115 produces the simultaneous rotation in the same direction of all the rollers of the arrangement.

The means 109 driving the rollers into rotation include a lower frame 140 constituted by the two flanges 140a, 140b, which are interconnected by the stays 141. Said frame carries the electric motor 142 with its speed reducing gear 143 which drives the pinion 144.

The two half-collars 106 and 107 are pivotally secured to the frame 140 through their spindles 121a, 121b which form the rotary axes of the rollers 111 and 115, respectively, and of the pinions 122 and 126, respectively, which latter mesh both with a central pinion 145 meshing in its turn with the output pinion 144 of the speed-reducing gear.

At the upper end of the machine, in opposed relationship with the driving system 109, is located the support 108 for the refractory electrode.

The actual electrode is designated by the reference number 146 and extends along the axis of a nozzle 147 through which an inert gas is blown onto the area to be welded. The nozzle 147 is carried by the transverse arm 148 connected with a sliding element carried by a radial adjusting mechanism 149 which is in its turn carried by a sliding element carried by an axial adjusting mechanism 150.

The axial adjusting mechanism 150 is carried by the support 108 which includes an element 108a in the shape of an L having a depending leg pivotally secured to the spindle 176 carried by the uppermost link on the half collar to the right hand side of FIG. 5.

The end of the L-shaped element 108a opposed to the spindle 176 carries a hook-shaped member 108b adapted to carry the cylindrical bar 108d rigid with the two flanges 108e, 108f, pivotally secured to the ends of the spindle 183 carried by the uppermost link on the left hand side of FIG. 5, said flanges being connected with each other by the cross-member 153.

A strap 151 is pivotally secured to the L-shaped member 108a at 162. Its medial transverse arm 151a includes a tapped opening 151b engaged by the clamping screw 152 rigid with the control handle 154. In its operative position, the end 152a of a reduced cross-section of the screw 152 enters an opening formed in the cross-member 153, said screw being tightened so that it may engage firmly through its shoulder 152b said cross-member, preferably with the interposition of Belleville washer means 157.

The operation of the arrangement is as follows:

The two tubes 101 and 102 are set in aligned joining relationship through the two ends to be welded together; the bevels 103, 104 which have been provided previously on said ends of the tubes, form the groove 105.

Round the tubes 101 and 102 are then fitted in vertical registry with said grooves the two half-collars described of which the locking means constituted by the screw 152 and the strap 151 have been previously released.

To this end, the two half-collars are arranged in a manner such that the rollers engage the bottom of the groove 105.

The treads such as 155 carrying the different rollers have a breadth such that they engage simultaneously the end of each of the two tubes, and they are thus in practice in contact with the groove throughout its bottom.

The central section 156 of the tread is recessed so as to prevent any contact with a possible projecting bead formed fortuitously between the tubes during the welding.

The collar constituted by the system disclosed is then closed by the engagement of the hook-shaped member 108b with the bar 108d followed by the positioning of the strap 151 and screwing home of the screw 152 through the agency of the handle 154 until the washers 157 are crushed, in a manner such that the rollers may tightly engage the bottom of the groove and thus provide for the mutual centering of the two bevelled ends against which said rollers bear simultaneously.

The welding electrode is then brought into a suitable position in the plane of connection through the agency of the radial and axial adjusting mechanism 149 and 150 and lastly the motor 142 is started. As already disclosed, the rotation of the motor 142 produces through the agency of the pinions 144 and 145, the rotation in the same direction of the system of rollers so as to thus drive the whole arrangement including the two half-collars round the tubes.

The refractory electrode is then energized while the nozzle 147 is fed with argon.

When the two tubes have been actually welded endwise throughout one complete revolution, the machine is stopped and, after unscrewing of the screw 152 and releasing of the collar-locking means, the two half-collars are freed and replaced by welding means operating through the agency of an autogenous welding blow-pipe, preferably fed automatically with a fuse wire with a view to proceeding with the complete filling of the groove 105.

In practice, during the welding operation produced by the refractory electrode, the inside of the tubes is subjected to an auxiliary heating and is kept in an atmosphere of argon under a slight pressure as well-known means which need not be described and are well-known in the art.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What I claim is:

1. A method for coaxially centering two tubes together before their welding by means of peripheral rollers, comprising forming along the outer periphery of the end of each tube a chamfered portion the contour of which matches one-half of the breadth of the tread of the rollers, laying the two tubes in a substantially coaxial position with their chamfered ends in adjacent juxtaposed relationship whereby the chamfers on the two tubes form together a perimetral groove across the juxtaposed ends of the tubes, and urging under pressure the rollers into engagement with said groove to ensure the desired centering of the tubes.

2. A method for coaxially centering two tubes together before their welding by means of peripheral rollers, comprising forming along the outer periphery of the end of each tube a chamfered portion the contour of which matches one-half of the breadth of the tread of the rollers and includes an arcuate concave section adjacent the outer periphery of the corresponding tube, laying the two tubes in a substantially coaxial position with their chamfered end portions in adjacent juxtaposed relationship whereby the chamfers on the two tubes form together a peripheral groove across the juxtaposed ends of the tubes, and urging under pressure the rollers into engagement with said groove to ensure the desired centering of the tubes.

3. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove along the periphery of the joint between the tubes, said machine comprising means carrying the two tubes in coaxial juxtaposed relationship and including a support and at least one pair of centering rollers revolvably carried by said support to either side of the vertical longitudinal plane of symmetry of the aligned tubes and engaging the bottom of said groove, means adapted to rotate said tubes about their axis and means for welding the tubes together.

4. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support, two members pivotally secured to the support about two pivotal axes lying in parallelism with the tube axis and symmetrically relative to the vertical plane passing through the tube axis and two rollers revolvably carried by each pivotal member to either side of its pivotal axis, said rollers matching the outline of said groove and engaging the bottom of the latter, means for rotating the tubes about their axis and means for welding the tubes together.

5. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove between the tubes said machine comprising means carrying the two tubes in coaxial juxtaposed relationship and including a support and at least one pair of centering rollers revolvably carried by said support to either side of the vertical longitudinal plane of symmetry of the aligned tubes and engaging the bottom of said groove, means adapted to rotate said tubes about their axis, means for welding the tubes together, a stationary frame provided with a raceway, a carrier plate including rollers adapted to run over said raceway, a vertically operating jack carried by said carrier plate and carrying said support and means releasably securing the carrier plate to the frame.

6. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support, a plurality of rollers each of which is provided with a tread the outline of which matches that of said groove distributed symmetrically to either side of the vertical plane of symmetry passing through the tube axis and engaging the bottom of said groove, additional rollers revolvably carried by said support and engaging the outer periphery of each tube, means driving said rollers to make the tubes rotate in unison and means for welding the tubes together.

7. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support and rollers revolvably carried by the support and matching the shape of the bottom of said groove to engage the latter snugly, means for welding the tubes together, and means for rotating the tubes relative to said welding means.

8. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support and rollers revolvably carried by the support and matching the shape of the bottom of said groove to engage the latter snugly, except along a narrow medial peripheral recessed section of the roller surface, means for welding the tubes together, and means for rotating the tubes relative to said welding means.

9. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support, two similar half-collars pivotally secured together and to said support, means for releasably locking the half-collars about said tubes, a plurality of centering rollers revolvably carried by each half-collar the outline of each of said centering rollers matches the outline of said groove to engage the bottom of the latter when the locking means are operative, welding means secured to said support, means for adjusting the position of said welding means relative to the tube axis and means for causing relative rotation between said half-collars and said tubes about the longitudinal axis thereof.

10. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support, two similar half-collars pivotally secured together and to said support, means for releasably locking the half-collars about said tubes, a plurality of centering rollers revolvably carried by each half-collar the outline of each of said centering rollers matches the outline of said groove to engage the bottom of the latter when the locking means are operative, a motor carried by the pivotal axis of the half-collars and operatively connected with at least one centering roller to cause relative rotation between said half-collars and said tubes about the longitudinal axis thereof, a welding electrode, and means for adjusting the position of said welding means relative to the tube axis.

11. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support, two similar half-collars pivotally secured together and to said support, means for releasably locking the half-collars about said tubes, a plurality of centering rollers revolvably carried by each half-collar and the outline of each of said centering rollers matches the outline of said groove to engage the bottom of the latter when the locking means are operative, a motor carried by the pivotal axis of the half-collars and operatively connected with at least one centering roller to cause relative rotation between said half-collars and said tubes about the longitudinal axis thereof, means operatively interconnecting all the rollers to ensure their rotation in unison, welding means secured to said support and means adjusting the position of said welding means relative to the tube axis.

12. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support, two similar half-collars pivotally secured together and to said support, said half-collars including each a plurality of pivotally interconnected links, means for releasably locking the half-collars about said tubes, a roller revolvably carried by at least one end of each link of each half-collar, the outline of each of said rollers matches the outline of said groove to engage the bottom of the latter when the locking means are operative, welding means secured to said support, means for adjusting the position of said welding means relative to the tube axis and means for causing relative rotation between said half-collars and said tubes about the longitudinal axis thereof.

13. A machine for coaxially centering two tubes to be welded together and the cooperating ends of each of which are provided with a bevel, the bevel on the end of one tube being symmetrical with the bevel on the end of the other tube relative to a plane extending perpendicularly to the axis of the aligned tubes to thereby form a groove extending across the plane separating the two tubes, said machine comprising means carrying the two tubes in coaxial juxtaposed relationship and including a support, two similar half-collars pivotally secured together and to said support, said half-collars each including a plurality of pivotally interconnected links, means for releasably locking the half-collars about said tubes, a roller revolvably carried by the pivotal axis between every two successive links of each half-collar and the outline of each of said rollers matches the outline of said groove to engage the bottom of the latter when the locking means are operative, a motor secured to said half-collars and operatively connected with at least one centering roller to cause relative rotation between said half-collars and said tubes about the longitudinal axis thereof, means operatively interconnecting the rollers at the ends of each link to make them rotate in unison, welding means secured to said support and means for adjusting the position of said welding means relative to the tube axis.

14. A machine for coaxially centering two juxtaposed tubes to be welded together end-to-end, each of the cooperating ends of said tubes provided with a bevel symmetrical to one another relative to a plane perpendicular to the axis of said juxtaposed tubes, said bevels forming a peripheral groove along said cooperating ends, said machine comprising straddling means at least partially surrounding said juxtaposed tubes, at least two centering rollers revolvably supported by said straddling means and adapted to ride in said groove in contact with the bottom thereof at peripherally spaced locations, means for causing relative rotation between said straddling means and said tubes about the longitudinal axis thereof and means for welding said tubes together.

References Cited
UNITED STATES PATENTS

| | | | |
|---|---|---|---|
| 1,509,507 | 9/1924 | Gruenfeldt | 219—159 |
| 1,638,024 | 8/1927 | Woodrow | 219—124 |
| 1,877,767 | 9/1932 | Koch | 219—60 |

JOSEPH V. TRUHE, *Primary Examiner.*